US006795300B1

(12) United States Patent
Holley

(10) Patent No.: US 6,795,300 B1
(45) Date of Patent: Sep. 21, 2004

(54) ROOF-TOP MOUNTED WIRING PORTAL ASSEMBLY

(76) Inventor: Edward L. Holley, 809 E. Main St., Apt. 1112, Lexington, SC (US) 29072

( * ) Notice: Subject to any disclaimer, the term of this patent is extended or adjusted under 35 U.S.C. 154(b) by 25 days.

(21) Appl. No.: 10/242,939

(22) Filed: Sep. 13, 2002

(51) Int. Cl.⁷ ............................................... H02B 1/00
(52) U.S. Cl. ........................... 361/601; 361/622; 174/1; 174/45 R; 174/48
(58) Field of Search ................................. 361/600, 601, 361/602, 622, 631, 641, 643, 659; 174/40 R, 43, 45 R, 48, 50; 52/220.08

(56) References Cited

U.S. PATENT DOCUMENTS

| | | | |
|---|---|---|---|
| 3,025,432 A | * | 3/1962 | Giegerich .................... 361/643 |
| 3,450,951 A | | 6/1969 | Boyle |
| 3,691,288 A | | 9/1972 | Sturdivan |
| 3,991,264 A | | 11/1976 | Connell |
| 4,156,270 A | | 5/1979 | Beatty |
| 4,264,779 A | * | 4/1981 | Rhodes et al. ................ 174/48 |
| 4,267,399 A | * | 5/1981 | Lux, Jr. .......................... 174/1 |
| 4,307,436 A | | 12/1981 | Eckart et al. |
| 4,323,723 A | | 4/1982 | Fork et al. |
| 4,365,108 A | | 12/1982 | Bright |
| 4,373,111 A | * | 2/1983 | Myers et al. .................. 174/48 |
| 4,519,657 A | | 5/1985 | Jensen |
| 5,002,502 A | * | 3/1991 | Hill ............................ 439/536 |
| 5,067,685 A | | 11/1991 | Johnston, Jr. |
| 5,287,665 A | | 2/1994 | Rath, Jr. |
| 5,582,026 A | | 12/1996 | Barto, Sr. |
| 5,611,616 A | | 3/1997 | Chandler |
| 6,225,909 B1 | | 5/2001 | Nill, Jr. |
| 6,268,563 B1 | * | 7/2001 | Gretz .......................... 174/53 |
| 6,270,043 B1 | * | 8/2001 | Alfrey ......................... 248/200 |
| 6,303,858 B1 | * | 10/2001 | Bosse, Jr. ..................... 174/48 |
| 6,417,446 B1 | * | 7/2002 | Whitehead .................... 174/48 |
| 6,506,973 B1 | * | 1/2003 | Howard et al. ............... 174/48 |

* cited by examiner

Primary Examiner—Boris Chervinsky
(74) Attorney, Agent, or Firm—Nelson Mullins Riley & Scarborough

(57) ABSTRACT

A wiring portal assembly for mounting to a roof curb of a structural roof comprises an elongate housing extending axially between a first end and a second end. A flashing skirt is located at an axially intermediate location of the elongate housing for sealingly engaging the roof curb. An attachment structure is located on the elongate housing for facilitating attachment of an electrical switch device.

25 Claims, 12 Drawing Sheets

ROOF-TOP MOUNTED WIRING PORTAL ASSEMBLY

BACKGROUND OF THE INVENTION

The present invention relates to the art of wiring conduits extending through the roof of a building. More particularly, the present invention relates to a roof-mounted wiring portal assembly that provides numerous advantages.

It is common to locate one or more HVAC units on the roof of a commercial building. For each of these HVAC units (often called "roof-top units" or "RTUs"), local building codes or other applicable regulations typically require a rated NEMA "disconnect." The "disconnect" is basically an electrical switch which cuts power to the RTU when it is to be serviced. Code typically requires either: (1) that the disconnect be located adjacent to the unit within the service technician's line of sight, or (2) if the disconnect is located away from the technician's line of sight, it must be padlocked and conspicuously tagged when the power is off.

In the past, electrician's have often mounted the disconnect directly to the sheet metal enclosure of the RTU itself. Unfortunately, the screws used for this purpose will frequently puncture the RTU's refrigerant coils or cause other damage to components within the enclosure. In addition, electricians will frequently mount the disconnect box directly over the unit manufacturer's ID plate. This may cause a delay in identifying the make and model of the RTU, thus delaying necessary maintenance on the unit.

Difficulties have also been encountered in the techniques used to pass electrical wiring through the roof to the RTUs. Typically, this has been accomplished using "pitch pockets," which are boxes mounted to the roof through which electrical conduit is inserted. After the box is mounted to the roof and the conduit is placed in the correct position, hot pitch is poured into the box to seal the conduit. The pitch hardens as it cools.

While pitch pockets have performed reasonably well, they are not without disadvantages. On hot days, for example, pitch may seep through the space between the conduit and the box. As the pitch level decreases over time, rain or snow will have a greater tendency to collect in the box. If the pitch then develops cracks, the collected water can penetrate the roof through the pitch pocket. In addition, the pitch pocket limits flexibility if changes in the electrical wiring become necessary later.

SUMMARY OF THE INVENTION

The present invention recognizes and addresses the foregoing considerations, and others, of prior art constructions and methods.

According to one aspect, the present invention provides a combination including a structural roof defining a configured aperture. A wiring portal assembly is sealingly mounted to the roof so as to extend through the configured aperture. Electrical wires are located inside of the wiring portal assembly so as to pass through the roof. An electrical switch device is attached to the wiring portal assembly and is electrically connected to the electrical wires.

In some presently preferred embodiments, the structural roof includes a roof curb defining the configured aperture. Preferably, the wiring portal assembly in such embodiments may include an elongate housing slidingly received in the roof curb. Often, the wiring portal assembly may desirably include at least one electrical outlet.

Embodiments of the invention are contemplated in which the wiring portal assembly includes a flashing skirt located at an axially intermediate location of the elongate housing. In this regard, the flashing skirt may be configured having a substantially radial first portion and a substantially axial second portion defining a pocket. Alternatively, the flashing skirt may comprise a substantially radial portion located under roofing material of the roof.

In many cases, the electrical switch device may be electrically connected to an HVAC unit located on the roof. Moreover, the electrical switch device will often be contained in a separate switch housing. The combination of the present invention may also include a second wiring portal assembly sealingly mounted to the structural roof so as to extend through a second configured aperture defined therein. In such embodiments, an attachment structure may be provided interconnecting both of the wiring portal assemblies. One or more electrical switch devices may be mounted to the attachment structure.

Another aspect of the present invention provides a wiring portal assembly for mounting to a roof curb of a structural roof. The assembly comprises an elongate housing extending axially between a first end and a second end. A flashing skirt is located at an axially intermediate location of the elongate housing for sealingly engaging the roof curb. An attachment structure is located on the elongate housing for facilitating attachment of an electrical switch device.

In some exemplary embodiments, the flashing skirt has a substantially radial first portion and a substantially axial second portion defining a pocket into which at least a portion of the roof curb is received. An elastomeric gasket may be located in the pocket of the flashing skirt.

Embodiments of the wiring portal assembly are contemplated wherein the elongate housing has first and second removable caps located at the first and second ends, respectively. In such embodiments, the first removable cap may define at least one knockout disc.

It will often be desirable to equip the wiring portal assembly with at least one electrical outlet. For example, the electrical outlet may be fixed to a service outlet compartment attached to the elongate housing. The service outlet compartment may preferably be located so as to cover and seal the second end of the elongate housing. A power transformer may also be located in the service outlet compartment.

In some embodiments, the attachment structure may comprise a pair of spaced apart brackets. In addition, the elongate housing may be substantially rectangular in its transverse cross-section.

A still further aspect of the present invention provides a combination comprising a wiring portal assembly adapted for side mounting at a predetermined location from which it extends outwardly and upwardly. An electrical switch device is attached to the wiring portal assembly. Electrical wires electrically connected to the electrical switch device are also provided. The electrical wires are located inside of the wiring portal assembly so as to extend from the predetermined location to the electrical switch device.

In many embodiments, the electrical switch device will be contained in a separate switch housing. In such embodiments, the wiring portal assembly may include attachment structure for facilitating attachment of the electrical switch device. For example, the attachment structure may comprise a pair of spaced apart brackets.

Often, the wiring portal assembly may be configured having an elongate housing with a first sloped section and a second vertical section. In addition, at least one removable access panel for providing access to an interior of the elongate housing may be provided.

Additional aspects of the present invention are achieved by a method of running electrical wire through a structural roof having a roof curb defining a configured aperture. One step of the method involves providing a wiring portal assembly including an elongate housing having a flashing skirt at an intermediate location thereof. Another step of the method involves inserting a bottom end of the elongate housing into the configured aperture. As a further step, the elongate housing is lowered until the flashing skirt sealingly engages the roof curb. An additional step of the method involves extending electrical wire between a first location above the roof and a second location below the roof inside of the elongate housing.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying drawings, in which.

Figure 1:
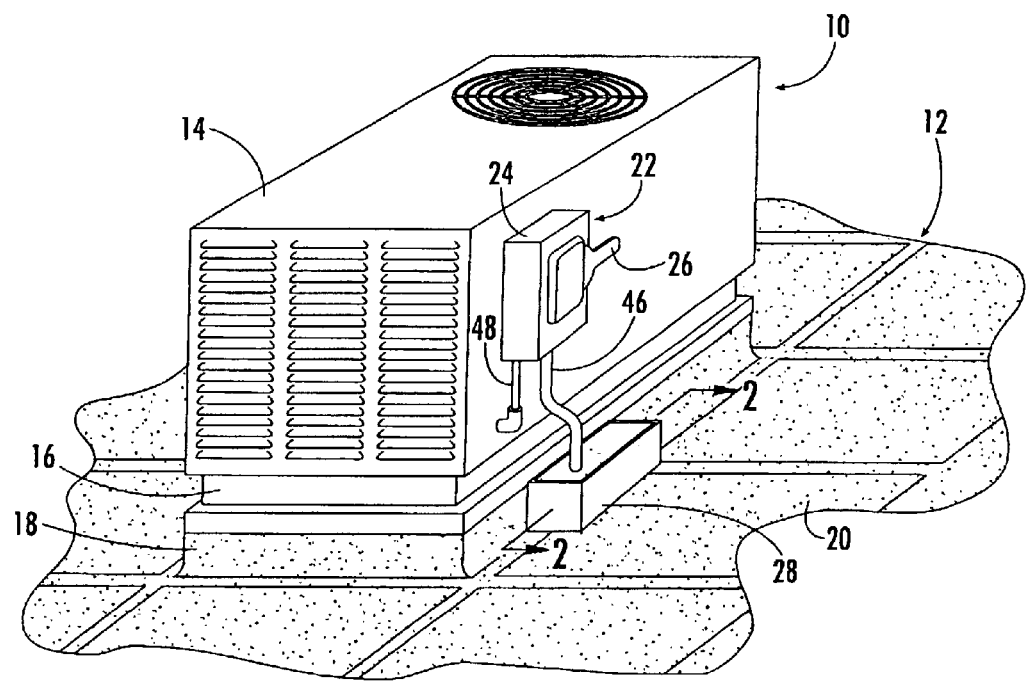
FIG. 1 is a perspective view of an HVAC unit located on a structural roof having a disconnect mounted and wired in accordance with the prior art.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

FIG. 1 illustrates a typical HVAC unit (or "RTU") 10 mounted on the roof 12 of a commercial building. As shown, RTU 10 has a main enclosure 14 located above a pedestal 16. Pedestal 16 sits on a roof curb 18 located on roof 12. As shown, roof 12 is covered with waterproof roofing material (typically impregnated felt) in the conventional manner.

A disconnect 22 is provided to cut off power to RTU 10 when maintenance is to be performed. As shown, disconnect 22 includes a separate housing or "box" 24 and a switch handle 26. When handle 26 is in the up position (as shown), power will be supplied to RTU 10. The technician will move handle 26 to the down position when the RTU is to be serviced.

It can be seen that box 24 of disconnect 22 is connected directly to the main enclosure 14 of RTU 10 in this case. Installers often mount disconnect 22 at this location because there is no other structure provided on the rooftop where it can be mounted. Unfortunately, mounting disconnect 22 directly to main enclosure 14 often leads to various other problems. For example, installers will often puncture the refrigerant coil inside of enclosure 14, thus causing a loss of refrigerant. This necessitates repair of the coil and replacement of the refrigerant. In addition, installers will occasionally mount disconnect box 24 directly over the name plate of the RTU. This leads to delays in identifying the make and model of the HVAC unit for maintenance purposes.

As known to those skilled in the art, it is necessary to run power and control wires to RTU 10 from a central breaker box generally located inside of the building. In accordance with the prior art, a pitch pocket 28 is typically installed on roof 12 to seal the location where the wires pass through.

Figure 2:
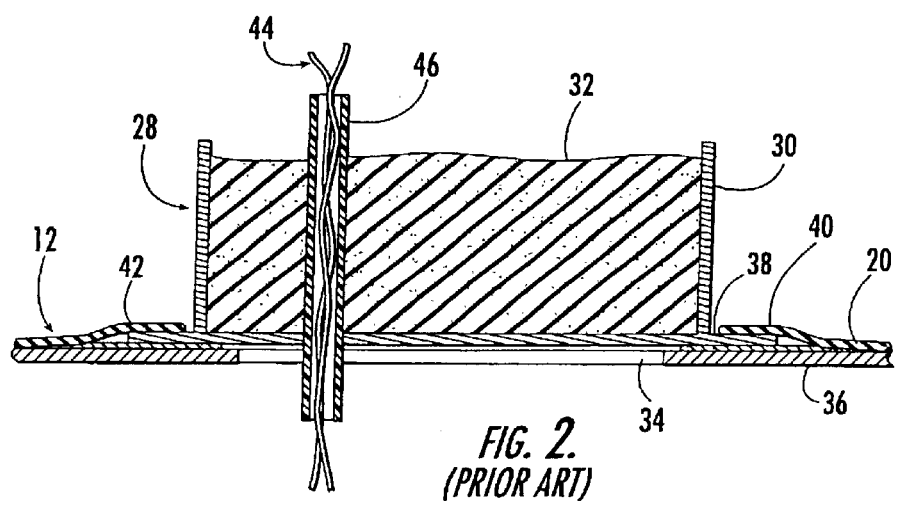
FIG. 2 is a cross sectional view of a prior art pitch pocket as taken along line 2—2 of FIG. 1.

As shown in FIG. 2, pitch pocket 28 includes a box 30 filled with pitch material 32. As shown, box 30 is mounted over an aperture 34 defined in a roof substrate 36. Typically, substrate 36 will be made of steel. Box 30 includes a radial flange 38 overlapped by roofing material 20, as indicated at 40. A suitable gasket 42 may be situated between the bottom surface of flange 38 and the top surface of substrate 36, as shown.

Electrical wires 44 are located inside of a suitable conduit 46 extending through pitch pocket 28. As shown in FIG. 1, conduit 46 terminates at disconnect 22. Another conduit 48 extends between disconnect 22 and RTU 10.

As discussed above, pitch pockets such as pitch pocket 28 are not without disadvantages. On hot days, for example, pitch material 32 may soften and seep through the space between conduit 46 and the bottom plate of box 30. Over time, rain or snow collecting in box 30 may then seep through cracks in pitch material 32, thus causing the roof to leak. In addition, pitch pockets limit flexibility if changes in the electrical wiring become necessary later.

Figure 3:
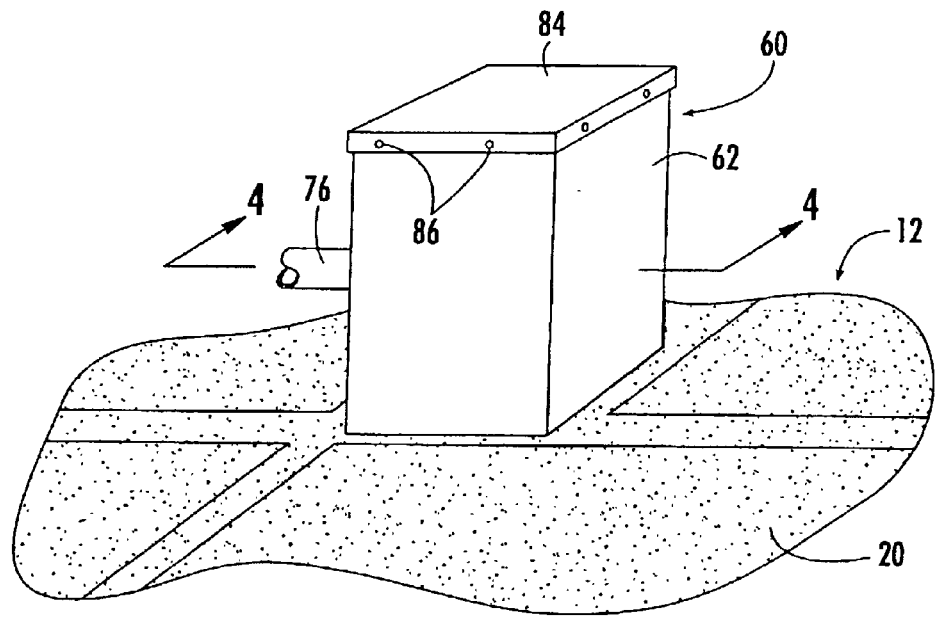
FIG. 3 is a perspective view of a prior art wiring portal located on a structural roof.
Figure 4:
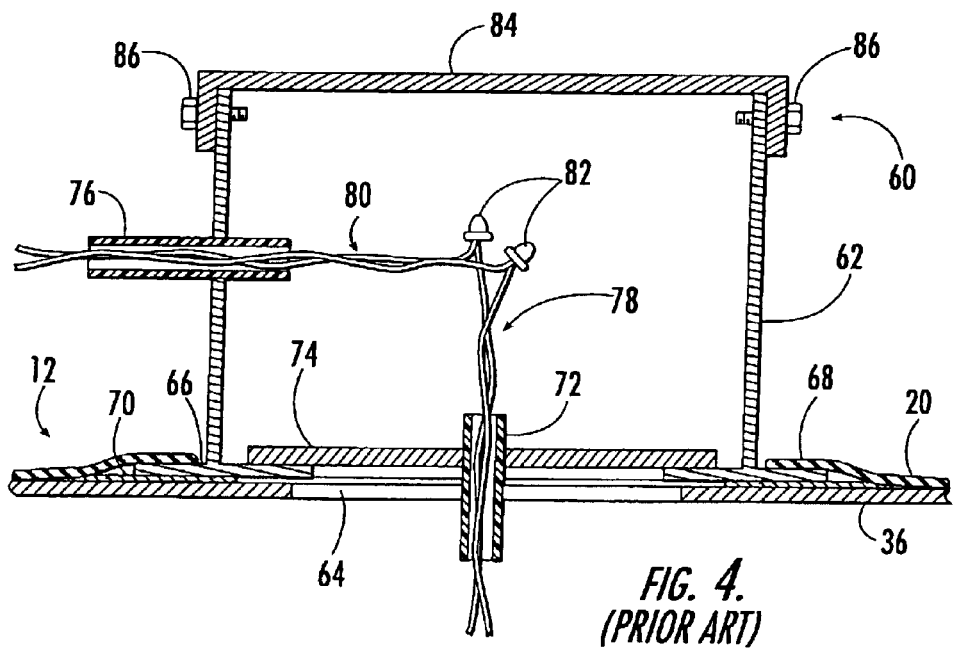
FIG. 4 is a view taken along line 4—4 of FIG. 3.

FIGS. 3 and 4 illustrate a prior art wiring portal 60. Wiring portal 60 includes a box 62 located above a configured aperture 64 defined in roof substrate 36. Box 62 includes a radial flange 66 overlapped by roofing material 20 as indicated at 68. A gasket 70 may be situated between radial flange 66 and the top surface of roof substrate 36.

As shown, wiring portal 60 includes a first conduit section 72 extending through aperture 64. Conduit section 72 is supported by a base plate 74 located in the bottom of box 62, as shown. A second conduit section 76 extends through a sidewall of box 62. In this case, a first set 78 of electrical wires extends through conduit section 72 and a second set 80 of electrical wires extends through conduit section 76. Wire sets 78 and 80 are interconnected by wire nuts 82 inside of box 62.

A weather-resistant cap 84 is located on top of box 62 as shown. Cap 84 is maintained in position by screws 86, which allow cap 84 to be removed for access to the interior of box 62 if desired.

Figure 5:
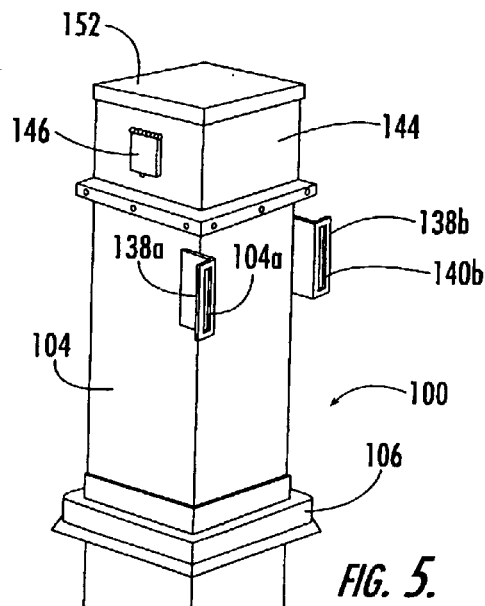
FIG. 5 is a perspective view showing the manner in which a wiring portal assembly of the present invention may be installed.
Figure 6:
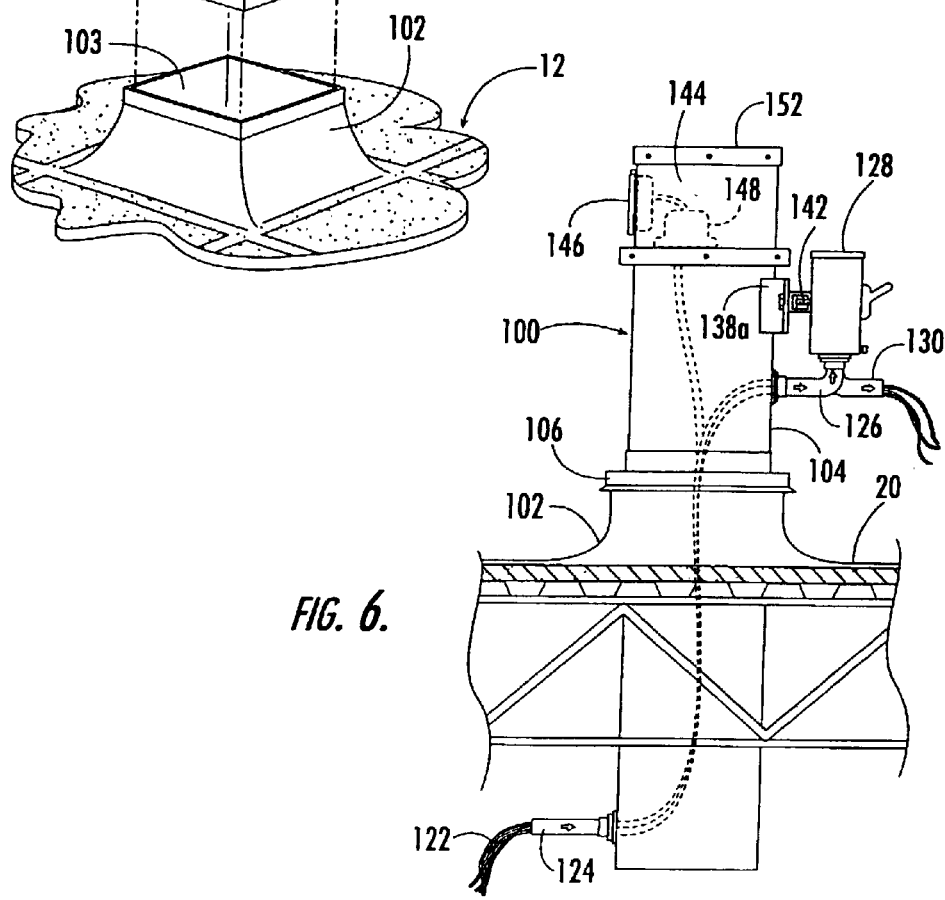
FIG. 6 is a side view showing the wiring portal assembly of FIG. 5 after installation.

FIGS. 5 and 6 illustrate a wiring portal assembly 100 constructed in accordance with the present invention. In this embodiment, assembly 100 is adapted to mate with a standard roof curb 102 (typically used for mounting exhaust fans and other such devices of relatively small size) provided on roof 12. Roof curb 102 defines a configured aperture 103 through the roof. Preferably, assembly 100 made be made substantially entirely of sheet metal, such as 16 gauge G-90 galvanized steel. The enclosure may be painted or otherwise treated to enhance its weather-resistance.

Referring now to FIGS. 8–11, assembly 100 includes an elongate housing 104. In this case, housing 104 has a generally rectangular cross section in the direction transverse to its axis. A flashing skirt 106 is fixed to housing 104 at an axially intermediate location.

Figure 11:
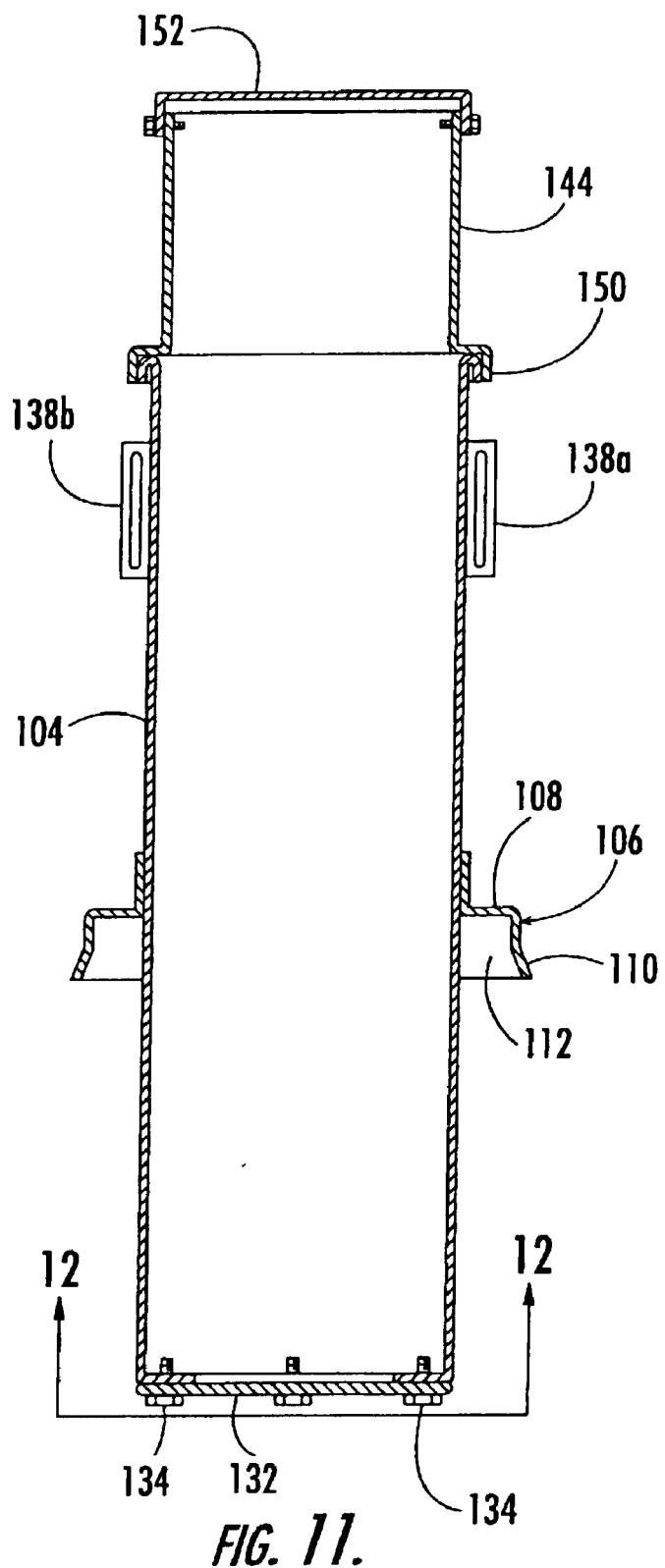
FIG. 11 is a cross sectional view taken along line 11—11 of FIG. 9.

As can be most clearly seen in FIG. 11, flashing skirt 106 has a first radial portion 108 and a second axial portion 110. Radial portion 108 and axial portion 110 together define a pocket 112 in which the top of roof curb 102 is received. As shown, axial portion 110 may define a flared lip to effectively divert rain water.

Figure 7:
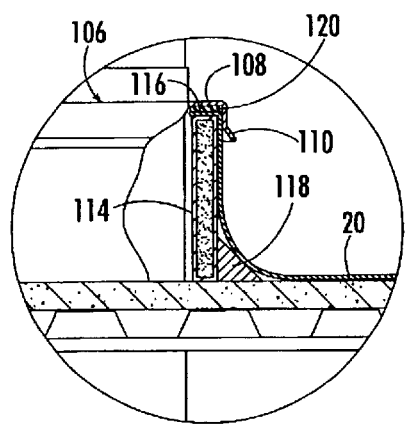
FIG. 7 is an enlarged cross-sectional view showing the manner in which the flange skirt sealingly engages the roof curb.
Figure 8:
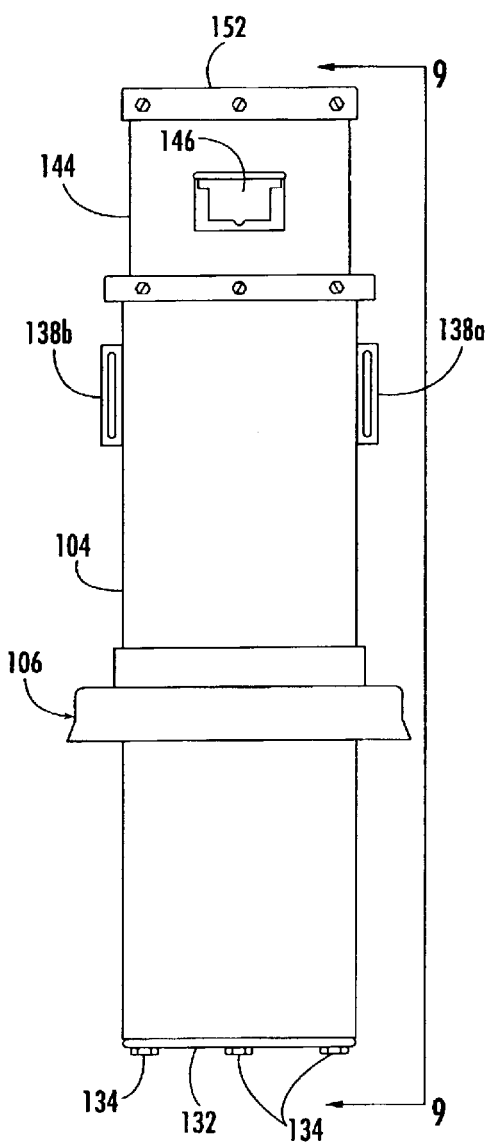
FIG. 8 is a back elevation of a wiring portal assembly of the present invention.
Figure 9:
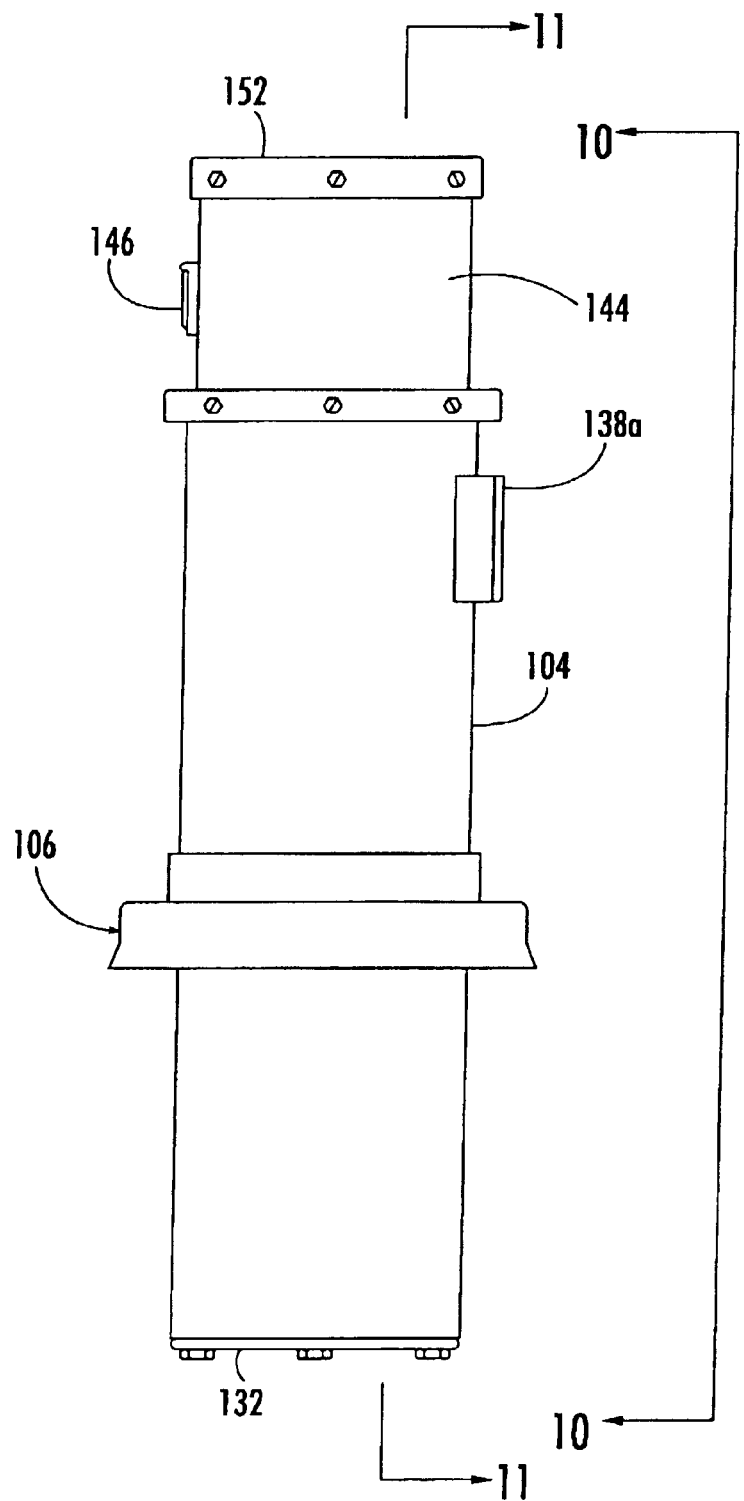
FIG. 9 is a side elevation of the wiring portal assembly as taken along line 9—9 of FIG. 8.
Figure 10:
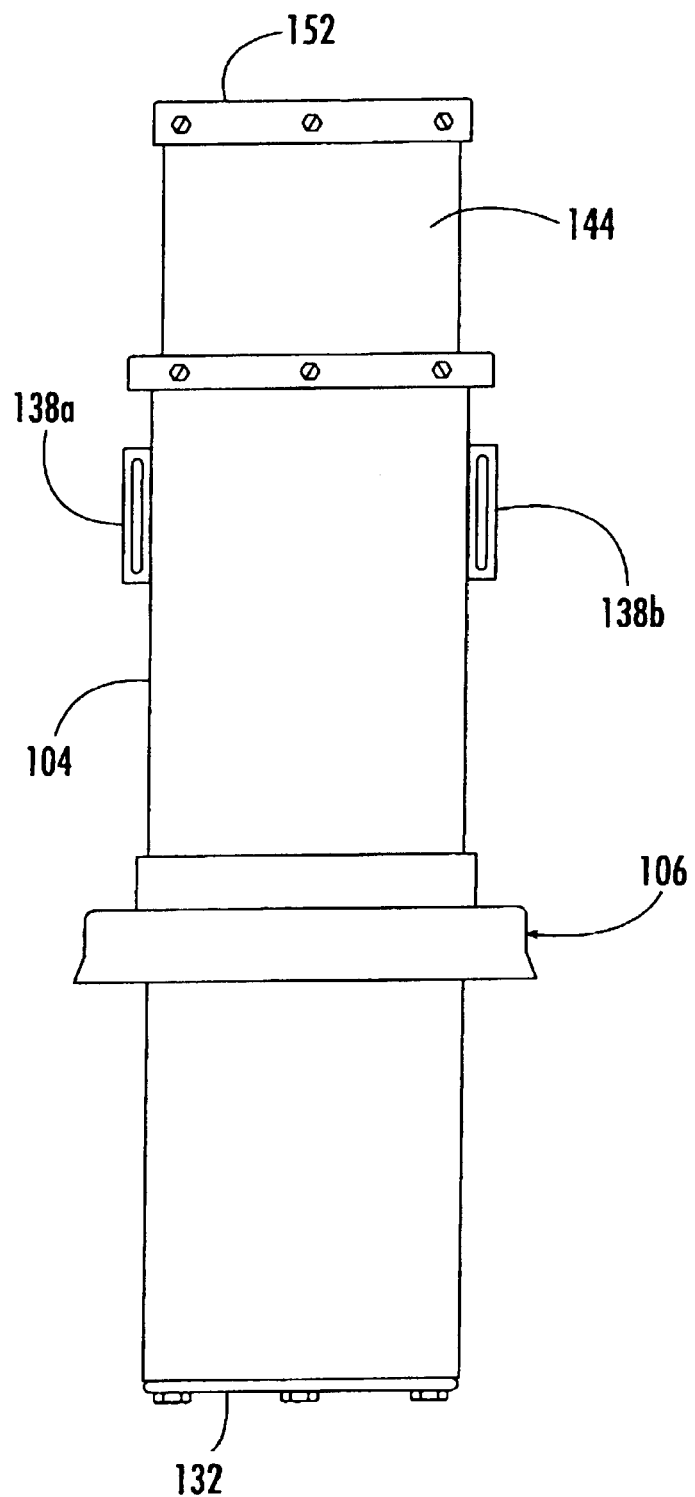
FIG. 10 is a front elevation of the wiring portal assembly as taken along line 10—10 of FIG. 9.

Referring now to FIG. 7, certain details about the construction of roof curb 102 can be most easily explained. Roof curb 102 may be constructed having wooden or metal sidewalls, such as sidewall 114. In this case, sidewall 114 is constructed as shown having an outer metal sheath filled with insulating material. Roofing material 20 is extended up and over the top of sidewall 114 (as indicated at 116) to provide continuous waterproofing. A canted member 118 may be provided at the base of sidewall 114 to support the curve in roofing material 20 at this location.

FIG. 5 illustrates the manner in which assembly 100 can be easily installed on the roof of a building. First, the bottom end of housing 104 is inserted into aperture 103. Housing 104 is then lowered until flashing skirt 106 engages the top of roof curb 102.

As shown in FIG. 7, an elastomeric gasket 120 may be provided on the bottom surface of radial portion 108 to produce a more effective seal between flashing skirt 106 and roof curb 102. In some cases, it may be desirable to anchor assembly 100 by extending screws through axial portion 110 of skirt 106 into sidewall 114 of roof curb 102. Holes in axial portion 110 necessary for this purpose may be either predrilled or produced by the installer at the job site.

As shown in FIG. 6, assembly 100 provides an effective passage through the roof for electrical wires 122 originating inside of the building. Toward this end, wiring conduit may be attached to housing 104 using standard connectors. For example, the illustrated embodiment shows a first conduit section 124 attached below the level of roof 12. A second conduit section 126 is attached to housing 104 above the level of roof 12. Conduit section 126 extends to a disconnect 128 mounted to assembly 100. Another conduit section 130 extends from disconnect 128 to the HVAC unit.

Figure 12:
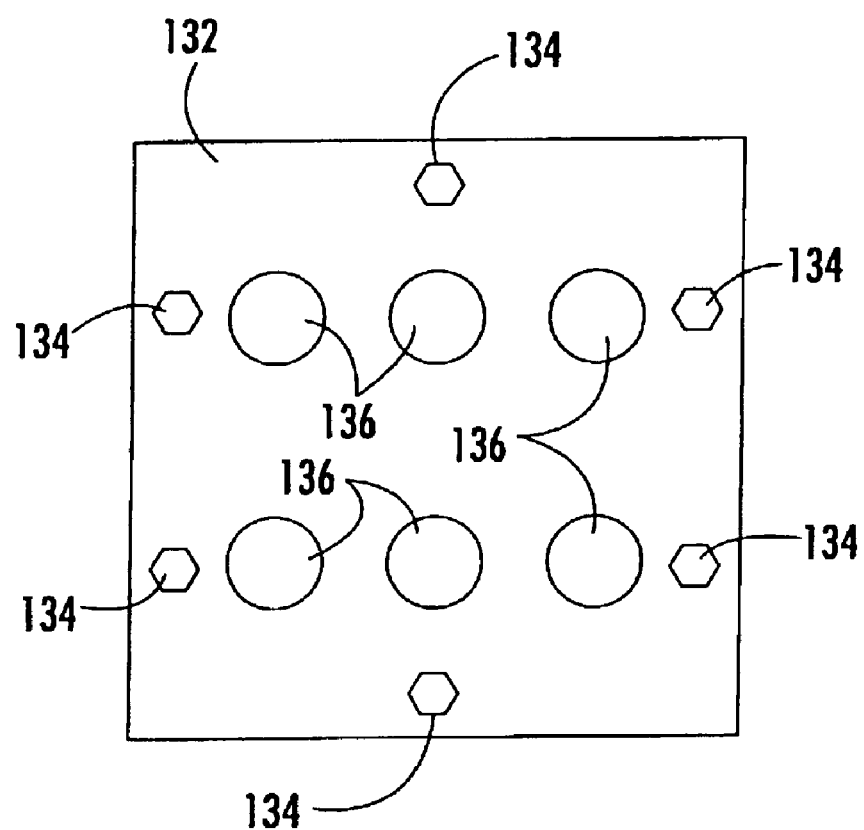
FIG. 12 is a bottom view taken along line 12—12 of FIG. 11.

As one skilled in the art will recognize, the sheet metal material from which housing 104 is typically formed may be easily "punched" by an installer. As a result, the installer will have great flexibility in locating the various conduits. In addition, assembly 100 may be equipped with knockouts at predetermined locations to provide even greater flexibility to the installer. For example, FIG. 12 illustrates a base plate 132 removably attached to the otherwise open end of housing 104 using screws 134 or other suitable means of attachment. As shown, a plurality of knockouts 136 are provided in base plate 132 for use by an installer. In this regard, the installer may produce a hole in base plate 132 by simply pushing away a selected knockout 136.

Referring again to FIG. 6, disconnect 128 is advantageously mounted to assembly 100. As a result, the need to attach disconnect 128 to the HVAC unit's main enclosure or to inconveniently locate disconnect 128 inside of the building is eliminated. In addition to avoiding the disadvantages noted above, this arrangement will often facilitate replacement of the entire HVAC unit. This is because the electrical wires extending between disconnect 128 and the old HVAC unit can be disconnected without disturbing other aspects of the wiring. After the old unit is removed and the new unit has been installed, the wires between disconnect 128 and the new HVAC unit can be easily reconnected. In addition, changes in the distance traversed by the wires between disconnect 128 and the new unit can be much more easily adjusted than would otherwise be the case.

Assembly 100 includes suitable attachment structure to facilitate mounting of disconnect 128. In this case, for example, a pair of spaced apart brackets 138a–b are located on housing 104. As shown in FIG. 5, brackets 138a-b define a respective vertical slot 140a–b in the illustrated embodiment. The distance between brackets 138a–b may be spanned by a structural member to which disconnect 128 is attached. As shown in FIG. 6, for example, the structural member may comprise a length of U-shaped channel 142, such as the type sold under the trademark Unistrut®. One skilled in the art will appreciate, however, that other suitable means of attaching disconnect 128 to assembly 100 may also be utilized.

Assembly 100 further permits an electrical outlet to be located in the vicinity of the HVAC unit. In the illustrated embodiment, for example, a service outlet compartment 144 is located at the top end of housing 104. An electrical outlet 146, typical of the outdoor duplex type, is located at service outlet compartment 144. Preferably, electrical power for outlet 146 is simply tapped from electrical wires 122. In cases where wires 122 are supplying power at a voltage other than 120 VAC, a power transformer may be conveniently located inside of assembly 100. For example, a power transformer 148 is located within service outlet compartment 144 in the illustrated embodiment. Outlet 146 provides electrical power for lights, tools, etc. used by a technician servicing the nearby HVAC unit.

As shown in FIG. 11, service outlet compartment 144 is configured as a removable module in the illustrated embodiment. Specifically, compartment 144 fits over the top end of housing 104 in lieu of a removable cap that could otherwise be placed at this location. In this regard, compartment 144 includes a peripheral flange 150 which prevents water penetration at the interface. Compartment 144 may further include its own removable cap 152 so that its interior can be accessed when desired. Preferably, cap 152 is also configured to prevent water penetration.

Figure 13A:
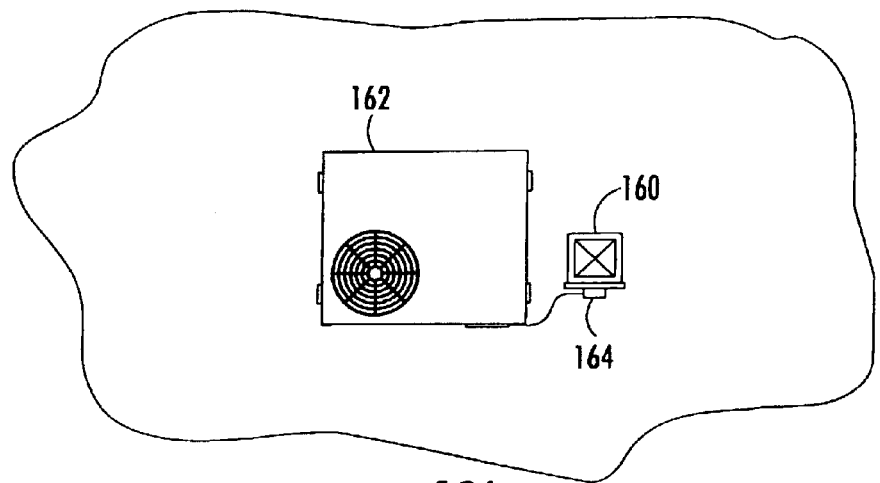
FIGS. 13A through 13C are diagrammatic representations from above showing a variety of installation options.
Figure 13B:
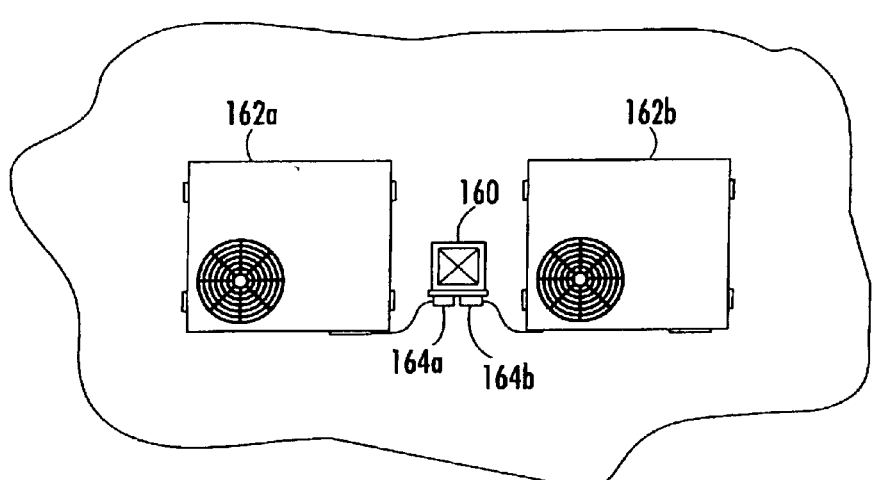
Figure 13C:
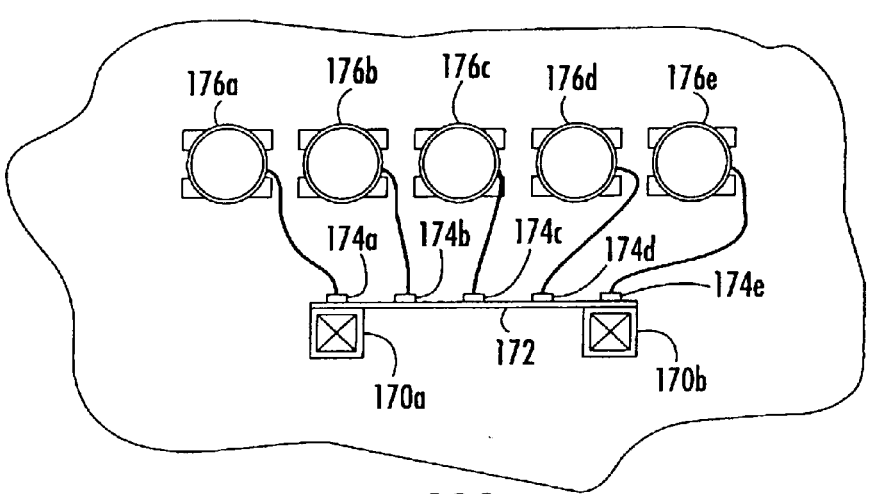

FIGS. 13A–C illustrate an additional advantage of the present invention. For example, FIG. 13A illustrates an application in which a single wiring portal assembly 160 of the present invention is associated with a single RTU 162. In this regard, a single disconnect 164 is mounted to assembly 160, as shown.

In FIG. 13B, however, a pair of disconnects 164a–b are mounted to assembly 160. Disconnects 164a–b are associated with respective RTUs 162a–b. In other words, power and control wires for multiple HVAC units can be run through a single portal assembly 160, which can also serve as the mounting location for the respective disconnects.

FIG. 13C illustrates an alternative wherein a pair of wiring portal assemblies 170a–b are spaced apart from one another on the roof. An attachment member 172, such as a sufficient length of Unistrut® channel or the like, is provided to span the distance between assemblies 170a–b. A plurality of disconnects 174a–e are mounted to attachment member 172. In this example, disconnects 174a–e are associated with respective HVAC condenser units 176a–e.

Figure 14:
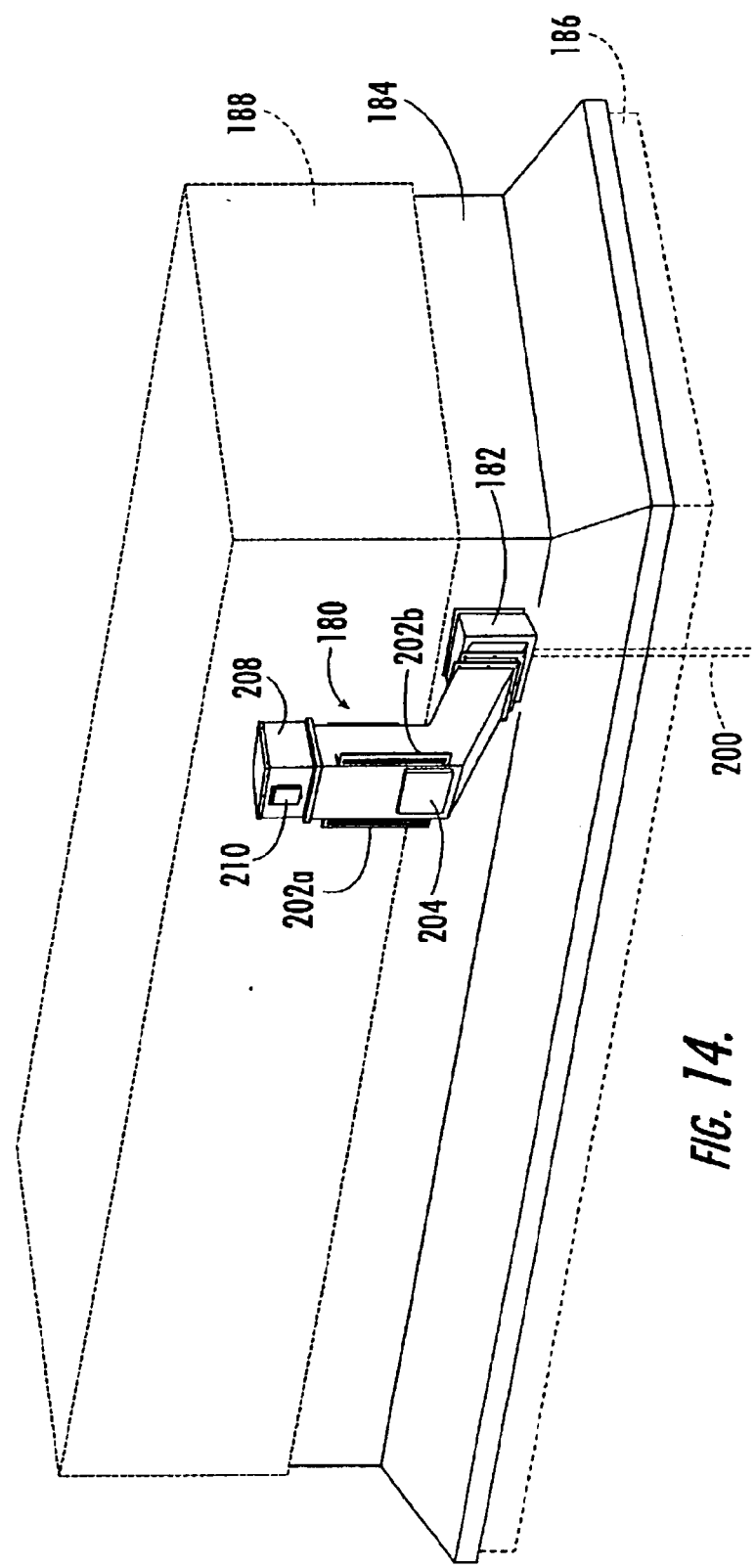
FIG. 14 is a perspective view of an alternative embodiment of the wiring portal assembly installed to a roof curb adapter.
Figure 15:
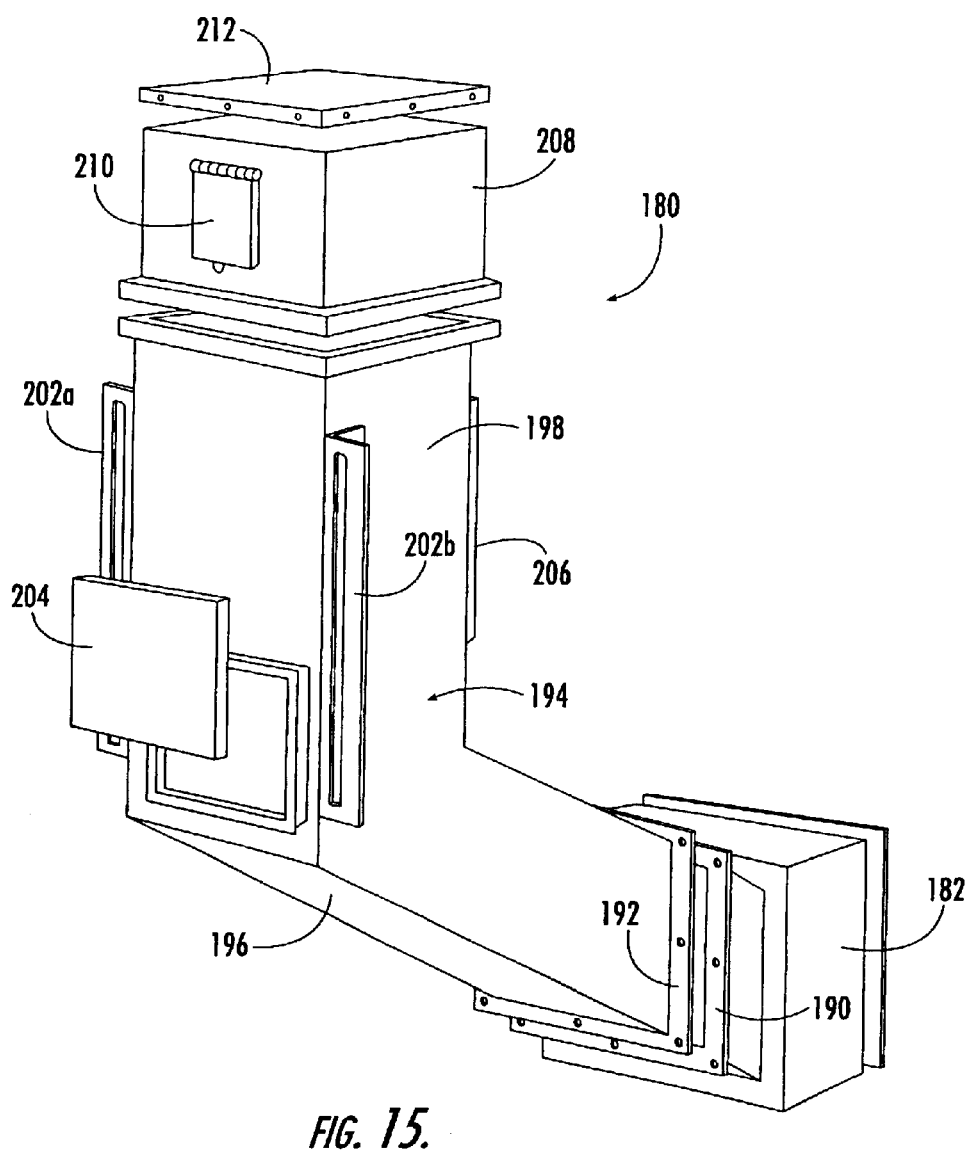
FIG. 15 is an enlarged view of the wiring portal assembly of FIG. 14.

FIGS. 14 and 15 illustrate an alternative embodiment of a wiring portal assembly constructed in accordance with the present invention. In this case, wiring portal assembly 180 is adapted for side mounting at a predetermined location. For example, a suitable mounting structure 182 may be provided on an adapter curb 184. Adapter curb 184 is utilized to convert a larger existing curb 186 to a smaller size required by a replacement HVAC unit 188.

As can be most easily seen in FIG. 15, mounting structure 182 includes a first flange 190 to which a second flange 192 of assembly 180 can be attached. An elastomeric gasket or other suitable sealing means may be provided between flanges 190 and 192. In addition, one skilled in the art will appreciate that other suitable techniques of side mounting assembly 180 can also be utilized.

Assembly 180 includes a main housing 194 extending upwardly and outwardly from wiring structure 182. In this case, for example, housing 194 includes a first sloped section 196 and a second vertical section 198.

In this embodiment, electrical wires 200 for power and control of the HVAC unit will penetrate the roof through a hole located within the periphery of roof curb 186. The wires pass through mounting structure 182 and main housing 194. As in the previous embodiment, a disconnect can be conveniently mounted to assembly 180 using suitable attachment structure. In this case, for example, a pair of spaced apart brackets 202a–b can be used in conjunction with Unistrut® channel as described above. One or more removable access panels, such as those shown at 204 and 206, provide access to the interior of main housing 194 (such as for disconnecting wires, etc.).

In this case, assembly 180 further includes an optional service outlet compartment 208. Service outlet compartment 208 includes an electrical outlet 210 and a removable cap 212 similar to those described above.

Figure 16:
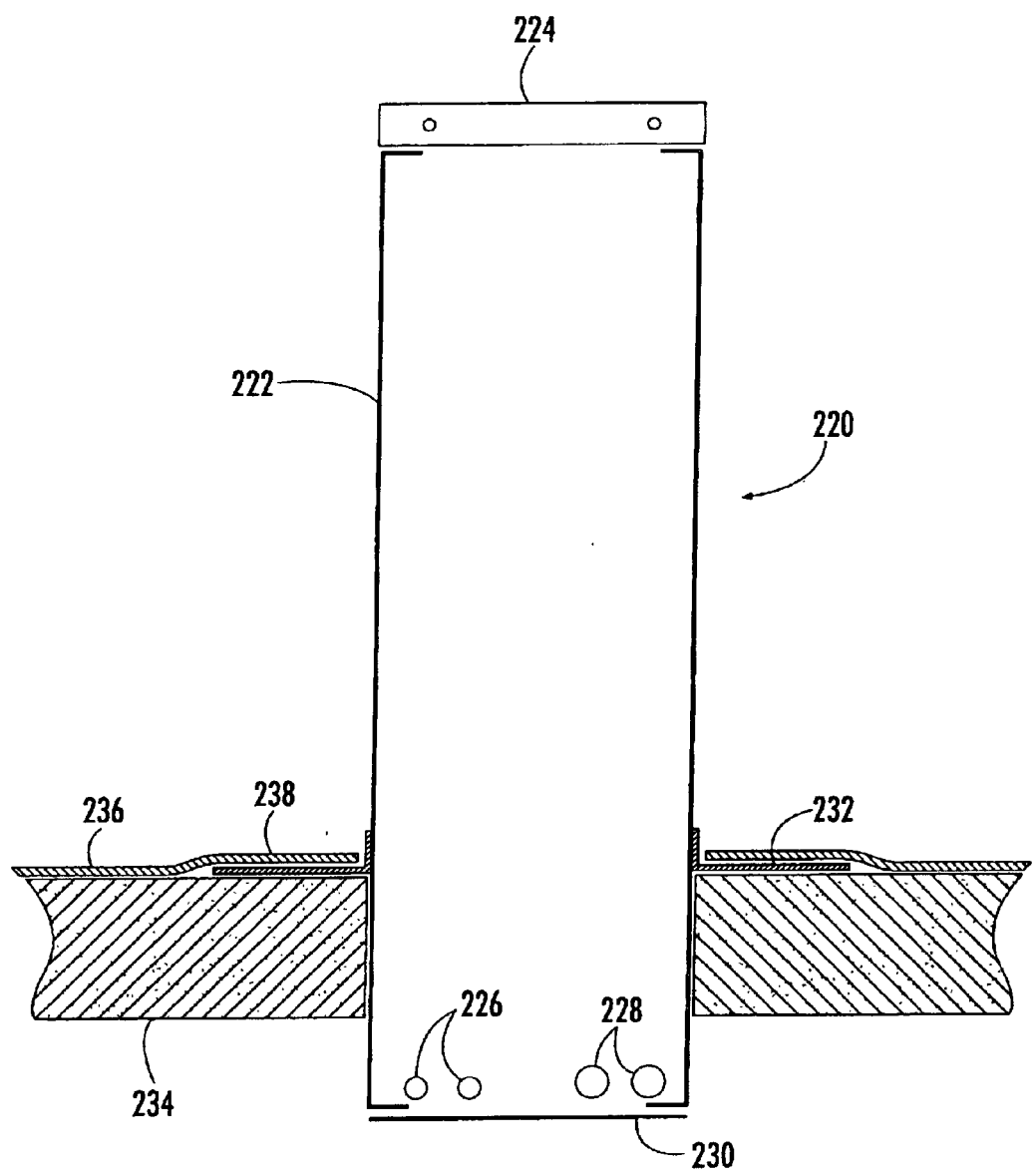
FIG. 16 is a cross sectional view of a further alternative embodiment of the wiring portal assembly.

FIG. 16 illustrates a further embodiment of the present invention. In this case, a wiring portal assembly 220 has a main housing 222. A removable cap 224 is located at the top of main housing 222. Knockouts of one or more sizes, such as those indicated at 226 and 228, may be provided near the bottom of main housing 222. In addition, a removable end plate 230 may be located at the bottom of main housing 222, as shown.

Housing 222 extends through a configured aperture defined in the roof. Toward this end, a skirt 232, fixed at an axially intermediate location on main housing 222, extends in a radial direction. In this case, skirt 232 sits atop the roof substrate 234. Roofing material 236 overlaps skirt 232, as indicated at 238, to prevent water penetration.

It can thus be seen that the present invention provides a novel wiring portal assembly which overcomes various drawbacks of the prior art. While preferred embodiments of the invention have been shown and described, modifications and variations may be made thereto by those skilled in the art without departing from the spirit and scope of the present invention. Thus, it should be understood that aspects of various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A combination comprising:
    a structural roof defining a configured aperture;
    a wiring portal assembly sealingly mounted to said structural roof so as to extend through said configured aperture;
    electrical wires located inside of said wiring portal assembly so as to pass through said roof; and
    an electrical switch device contained in a separate switch housing attached to said wiring portal assembly, said electrical switch device being electrically connected to said electrical wires.

2. A combination as set forth in claim 1, wherein said structural roof includes a roof curb defining said configured aperture.

3. A combination as set forth in claim 2, wherein said wiring portal assembly includes an elongate housing slidingly received in said roof curb.

4. A combination as set forth in claim 3, wherein said wiring portal assembly includes a flashing skirt located at an axially intermediate location of said elongate housing for sealingly engaging said roof curb.

5. A combination as set forth in claim 1, wherein said wiring portal assembly further includes at least one electrical outlet.

6. A combination as set forth in claim 1, wherein said wiring portal assembly includes a flashing skirt located at an axially intermediate location of said elongate housing.

7. A combination, comprising:
    a structural roof defining a configured aperture;
    a wiring portal assembly sealingly mounted to said structural roof so as to extend through said configured aperture;
    said wiring portal assembly including a flashing skirt located at an axially intermediate location of said elongate housing, wherein said flashing skirt has a substantially radial first portion and a substantially axial second portion defining a pocket;
    electrical wires located inside of said wiring portal assembly so as to pass through said roof; and
    an electrical switch device attached to said wiring portal assembly, said electrical switch device being electrically connected to said electrical wires.

8. A combination as set forth in claim 6, wherein said flashing skirt comprises a substantially radial portion located under roofing material of said roof.

9. A combination as set forth in claim 1, wherein said electrical switch device is electrically connected to an HVAC unit located on said roof.

10. A combination comprising:
    a structural roof defining a configured aperture;
    a wiring portal assembly sealingly mounted to said structural roof so as to extend through said configured aperture;

electrical wires located inside of said wiring portal assembly so as to pass through said roof;

an electrical switch device attached to said wiring portal assembly, said electrical switch device being electrically connected to said electrical wires;

a second wiring portal assembly sealingly mounted to said structural roof so as to extend through a second configured aperture defined therein;

an attachment structure interconnecting both of said wiring portal assemblies; and said electrical switch device being mounted to said attachment structure.

11. A combination as set forth in claim 10, comprising a plurality of said electrical switch devices attached to said attachment structure.

12. A wiring portal assembly for mounting to a roof curb of a structural roof, said assembly comprising:

an elongate housing extending axially between a first end and a second end;

a flashing skirt located at an axially intermediate location of said elongate housing for sealingly engaging said roof curb, wherein said flashing skirt has a substantially radial first portion and a substantially axial second portion defining a pocket into which at least a portion of said roof curb is received; and attachment structure located on said elongate housing for facilitating attachment of an electrical switch device.

13. A wiring portal assembly as set forth in claim 12, further comprising an elastomeric gasket located in said pocket of said flashing skirt.

14. A wiring portal assembly as set forth in claim 12, wherein said elongate housing has first and second removable caps located at said first end and said second end, respectively.

15. A wiring portal assembly as set forth 14, wherein said first removable cap defines at least one knockout disc.

16. A wiring portal assembly as set forth in claim 12, further comprising at least one electrical outlet.

17. A wiring portal assembly as set forth in claim 16, wherein said electrical outlet is fixed to a service outlet compartment attached to said elongate housing.

18. A wiring portal assembly as set forth in claim 17, wherein said service outlet compartment is located so as to cover and seal said second end of said elongate housing.

19. A wiring portal assembly as set forth in claim 17, further comprising a power transformer located in said service outlet compartment.

20. A wiring portal assembly as set forth in claim 12, wherein said attachment structure comprises a pair of spaced apart brackets.

21. A wiring portal assembly as set forth in claim 12, wherein said elongate housing is substantially rectangular in its transverse cross-section.

22. A method of running electrical wire through a structural roof having a roof curb defining a configured aperture, said method comprising steps of:

(a) providing a wiring portal assembly including an elongate housing having a flashing skirt at an intermediate location thereof;

(b) inserting a bottom end of said elongate housing into said configured aperture;

(c) lowering said elongate housing completely through said configured aperture until said flashing skirt sealingly engages said roof curb; and (d) extending electrical wire between a first location above said roof and a second location below said roof inside of said elongate housing.

23. A method as set forth in claim 22, further comprising the steps of:

(e) mounting an electrical switch device contained in a separate housing to said wiring portal assembly; and (e) electrically connecting said electrical switch device to said electrical wire.

24. A method as set forth in claim 23, wherein said electrical switch device is mounted to said wiring portal assembly using a strut.

25. A method as set forth in claim 22, wherein said elongate housing of said wiring portal assembly is substantially rectangular in its transverse cross section.

\* \* \* \* \*